United States Patent
Hamilton-Gahart

(10) Patent No.: US 7,142,745 B1
(45) Date of Patent: Nov. 28, 2006

(54) WDM RING INTERCONNECTION

(75) Inventor: Jeff Hamilton-Gahart, Santa Rosa, CA (US)

(73) Assignee: Cisco Technology, Inc., San Jose, CA (US)

( * ) Notice: Subject to any disclaimer, the term of this patent is extended or adjusted under 35 U.S.C. 154(b) by 47 days.

(21) Appl. No.: 10/253,096

(22) Filed: Sep. 24, 2002

(51) Int. Cl.
*G02B 6/28* (2006.01)

(52) U.S. Cl. .................................................. 385/24

(58) Field of Classification Search ............... 385/24, 385/15, 16, 27, 31
See application file for complete search history.

(56) References Cited

U.S. PATENT DOCUMENTS

| | | | |
|---|---|---|---|
| 5,809,196 A | 9/1998 | Meli et al. | 385/123 |
| 5,943,151 A | 8/1999 | Grasso et al. | 359/161 |
| 6,288,810 B1 * | 9/2001 | Grasso et al. | 398/9 |
| 6,426,815 B1 | 7/2002 | Koehler | 359/119 |
| 6,600,582 B1 * | 7/2003 | Liu et al. | 398/79 |
| 6,708,002 B1 * | 3/2004 | Novak et al. | 398/79 |

\* cited by examiner

*Primary Examiner*—Jared J. Fureman
*Assistant Examiner*—Daniel St. Cyr
(74) *Attorney, Agent, or Firm*—Aka Chan LLP

(57) ABSTRACT

Optical signals may be carried to and from a ring without the use of chromatic dispersion compensation. In one embodiment, a WDM ring incorporates chromatic dispersion compensation and carries wavelength-multiplexed optical signals with disparate data rates. At least one optical signal is transmitted away from the ring along a link that does not incorporate chromatic dispersion compensation. For example, the ring may carry both OC-192 (10 Gbps) and OC-48 (2.5 Gbps) optical signals with one or more OC-48 signals being transmitted away from the ring without the use of chromatic dispersion compensation. The OC-48 signal reach is not dispersion-limited due to the chromatic dispersion compensation applied within the ring.

21 Claims, 4 Drawing Sheets

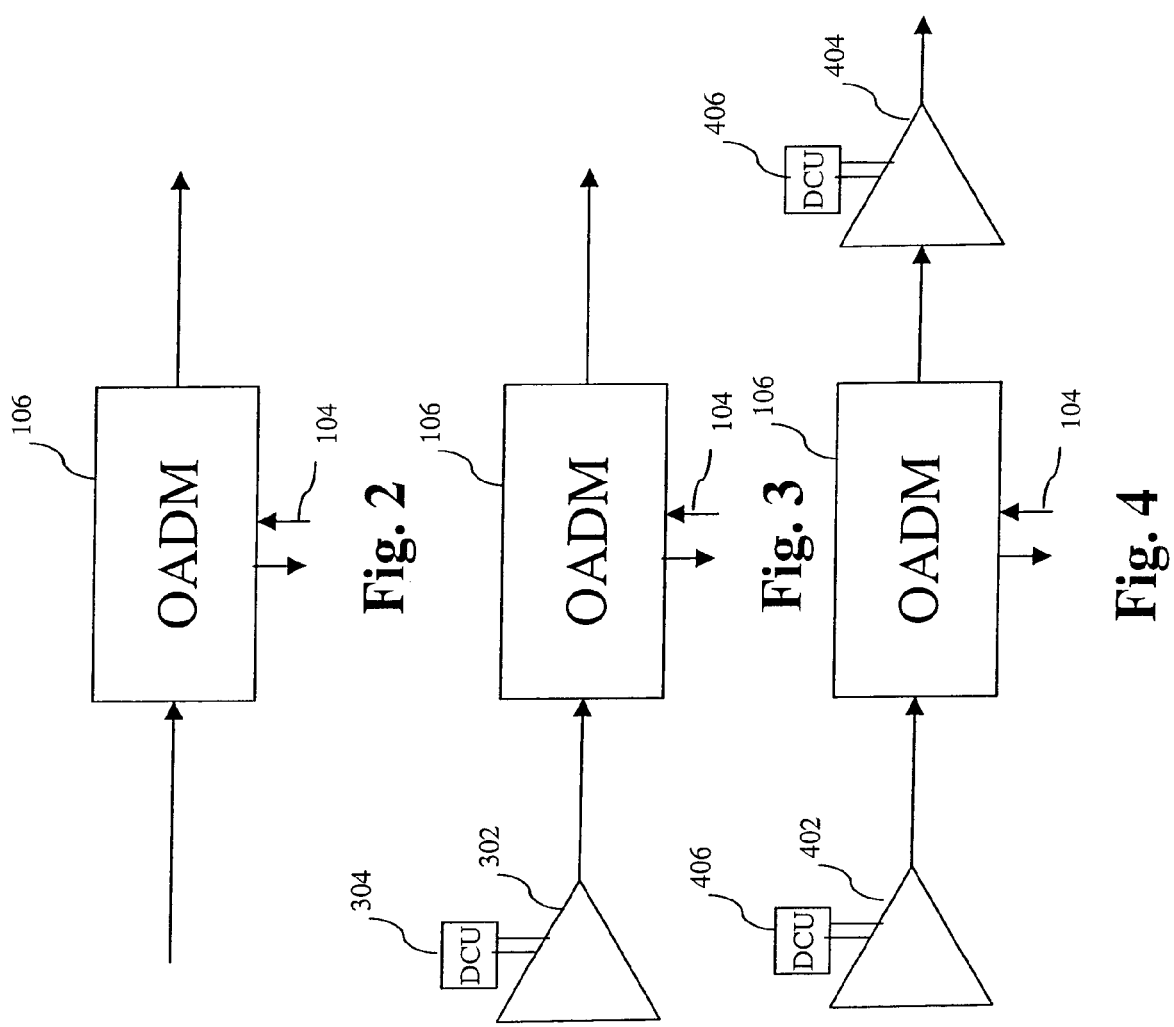

WDM RING INTERCONNECTION

BACKGROUND OF THE INVENTION

The present invention relates to data communication, and more particularly to optical networking.

Metropolitan optical rings have emerged as key building blocks in modern data networks. They offer high data rate services in a metropolitan environment in addition to advanced protection and network management features. Further increases in optical ring data carrying capacity result from the application of WDM (wavelength division multiplexing) techniques that combine multiple optical signals on the same fiber.

It is desirable to interconnect such rings, even at large distances without the need for intermediate optical-electrical-optical conversion. Traditional long-haul (LH) point-to-point WDM links incorporate very expensive broadband amplifiers to effectively amplify numerous WDM channels. Furthermore, due to the distance traversed by the optical signals and the modulation data rate, chromatic dispersion constitutes a significant transmission impairment. To mitigate the effects of chromatic dispersion, amplifier sites of such links are typically equipped with expensive chromatic dispersion compensation equipment in the form of chromatic dispersion compensation gratings and/or dispersion compensating fiber. The combination of broadband amplifiers and chromatic dispersion compensation equipment greatly increases the costs of links carrying core traffic to and from rings.

What is needed are cost-effective systems and methods for providing long distance connections to and from optical rings.

SUMMARY OF THE INVENTION

By virtue of one embodiment of the present invention, optical signals may be carried to and from a ring without the use of chromatic dispersion compensation. In one embodiment, a WDM ring incorporates chromatic dispersion compensation and carries wavelength-multiplexed optical signals with disparate data rates. At least one optical signal is transmitted away from the ring along a link that does not incorporate chromatic dispersion compensation. For example, the ring may carry both OC-192 (10 Gbps) and OC-48 (2.5 Gbps) optical signals with one or more OC-48 signals being transmitted away from the ring without the use of chromatic dispersion compensation. The OC-48 signal reach is not dispersion-limited due to the chromatic dispersion compensation applied within the ring.

A first aspect of the present invention provides a method of operating an optical network. The method includes: operating a first WDM ring carrying a first wavelength having a first data rate signal and a second wavelength having a second data rate signal, within the first WDM ring, applying chromatic dispersion compensation to both the first wavelength and the second wavelength, and transmitting the second wavelength over a link away from the ring, the link not incorporating chromatic dispersion compensation.

A second aspect of the present invention provides apparatus for operating an optical network. The apparatus includes: a first WDM ring carrying a first wavelength having a first data rate signal and a second wavelength having a second data rate signal, the first WDM ring being equipped with chromatic dispersion compensating equipment operative to provide chromatic dispersion compensation on both the first wavelength and the second wavelength, and a link carrying the second data rate signal away from the link, the link not incorporating chromatic dispersion compensation equipment.

BRIEF DESCRIPTION OF THE DRAWINGS

FIG. 2 depicts an optical add/drop multiplexer (OADM) configuration according to one embodiment of the present invention.

FIG. 3 depicts an OADM configuration that incorporates an amplifier with a mid-stage dispersion compensating unit according to one embodiment of the present invention.

FIG. 4 depicts an OADM configured with two amplifiers, both incorporating mid-stage dispersion compensation units.

DESCRIPTION OF SPECIFIC EMBODIMENTS

The present invention will be described with reference to a representative optical communication network. Optical rings are key building blocks in the representative network. These rings may be metropolitan rings where the total fiber span around the ring amounts to e.g., hundreds of kilometers. In the implementation discussed herein, the rings employ wavelength division multiplexing (WDM) to carry multiple optical signals on disparate wavelengths. Various elements such as optical add-drop multiplexers (OADMs), multiplexers, demultiplexers, etc. extract and insert selected wavelengths to provide access to the ring and interconnection to other networks. This network environment is, however, merely representative of applications of the present invention.

Figure 1:
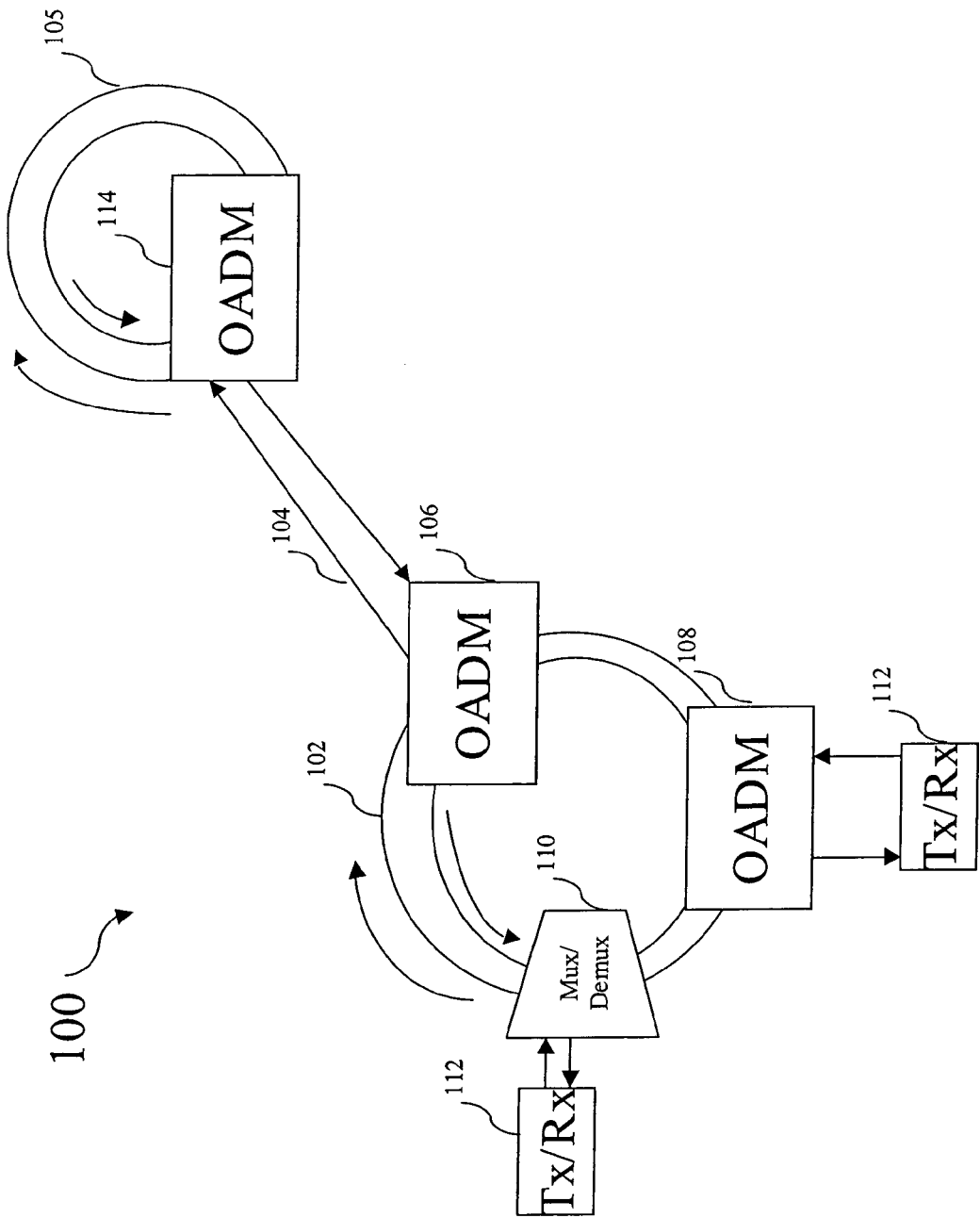
FIG. 1 depicts two optical rings and an inter-ring link according to one embodiment of the present invention.

FIG. 1 depicts an optical network 100. A first WDM ring 102 operates bi-directionally with both clockwise and counterclockwise light flow. In one embodiment, WDM ring 102 carries 32 wavelengths. The optical signals carried by WDM ring 102 are modulated with data signals with different wavelengths being assigned different data rates. For example, 24 wavelengths may carry 2.5 Gbps (OC-48) data signals while the remaining 8 wavelengths may carry 10 Gbps (OC-192) signals.

Chromatic dispersion is an effect caused by the frequency dependence of propagation velocity down optical fiber. Over the width of a modulated optical signal spectrum, different frequency domain components arrive at slightly different times due to dispersion. The effect is inter-symbol interference due to simultaneous receipt of optical signal energy corresponding to two or more data symbols. It will be appreciated that increased data rate compounds the chromatic dispersion effect in two respects. The greater bandwidth of the modulated signal broadens the variation in arrival times of spectral components while the shorter time span of the data symbols reduces tolerance to these variations.

Accordingly, optical ring 102 incorporates chromatic dispersion compensation equipment in the form of e.g., chromatic dispersion compensating gratings, chromatic dispersion compensating fiber, to introduce chromatic dispersion opposite in sign to that introduced by the transmission fiber, thereby mitigating the deleterious dispersion effects. This is not generally necessary for the successful transmission of OC-48 signals over the distances between nodes on ring 102 but is rather included to facilitate error-free communication of the OC-192 signals.

However, since chromatic dispersion compensation is applied to the composite WDM signals, it is applied to all wavelengths including the ones carrying OC-48 data. In accordance with the present invention, this creates an opportunity to carry the OC-48 data away from the ring over a relatively large distance without the use of chromatic dispersion compensation equipment. The chromatic dispersion compensation applied to the OC-48 signal within ring 102 effectively pre-compensates for the dispersion encountered over a link 104. Furthermore, since a relatively small number of channels are being carried across link 104, mid-link optical amplification can be provided by low-cost narrowband, e.g., 10 nm, amplifiers. By avoiding the need for chromatic dispersion compensation and broadband amplification, link 104 may be implemented at low cost, even at distances of e.g., 300 km.

Referring again to FIG. 1, further details of a network according to one embodiment of the present invention will be explained. Ring 102 interconnects to another ring 105 via link 104. Ring 105 may be substantially similar in structure to ring 102. Link 104 may, however, extend to any type of network or other termination point.

FIG. 1 depicts ring 102 as a bi-directional ring with clockwise and counterclockwise light flow. Representative nodes on ring 102 are also depicted and include an OADM 106, an OADM 108 and a multiplexer/demultiplexer 110. OADMs 106 and 108 remove and substitute selected wavelengths from the light flow around ring 102. OADM 106 operates to remove wavelengths to be relayed along link 104 and insert wavelengths received from link 104. These units are merely representative of the nodes that may be positioned around an optical ring.

OADM 108 and multiplexer/demultiplexer 110 operate as interfaces to optical transceivers 112. Optical transceivers 112 recover data from the received optical signals and modulate data onto optical signals to be transmitted. An example of a commercially available product incorporating the functionality of optical transceivers 112 is the ONS 15454 manufactured by Cisco Systems of San Jose, Calif.

Ring 105 is presented in simplified form. A single OADM 114 operates to swap wavelengths between ring 105 and link 104. Other nodes are not shown but ring 105 can, for example, have a structure similar to that of ring 102.

Around ring 102, there are also optical amplifiers and chromatic dispersion compensation units. In one particular implementation, 22 dB of optical amplification and −1150 ps/nm of chromatic dispersion compensation are provided at intervals of 80 km or less. Any type of suitable optical amplification may be used including, e.g., Erbium-doped fiber amplifiers (EDFAs). Chromatic dispersion compensation may be provided by, e.g., dispersion compensating fiber or dispersion compensating gratings as known in the art. Amplification and chromatic dispersion compensation equipment may be co-located with the various nodes of ring 102 or located at intermediate points between nodes.

The use of chromatic dispersion compensation and amplification at OADM 106 will be described in greater detail with reference to FIGS. 2–6. In the simplest case shown in FIG. 2, link 104 is sufficiently short such that is not essential to provide OADM 106 with extra chromatic dispersion compensation or amplification. FIG. 2 also assumes that the operation of ring 102 does not require chromatic dispersion compensation or amplification at the site of OADM 106 because they have been provided adequately elsewhere on the ring.

FIG. 3 depicts an embodiment where an optical amplifier 302 is positioned at the input of OADM 106. Optical amplifier 302 may be a two-stage amplifier with a mid-stage dispersion compensation unit 304. Optical amplification and dispersion compensation are thus provided to all the wavelengths passing through OADM 106 including those to be relayed onto link 104. No amplification or chromatic dispersion compensation are, however, supplied to the wavelengths received over link 104.

FIG. 4 depicts an embodiment where optical amplifiers 402 and 404 are positioned at the input and output, respectively, of OADM 106. Amplifiers 402 and 404 are two-stage amplifiers incorporating mid-stage dispersion compensating units 406. In this way, signals transmitted over link 104 are amplified and dispersion compensated prior to transmission and signals received over link 104 are amplified and dispersion compensated after reception.

Figure 5:
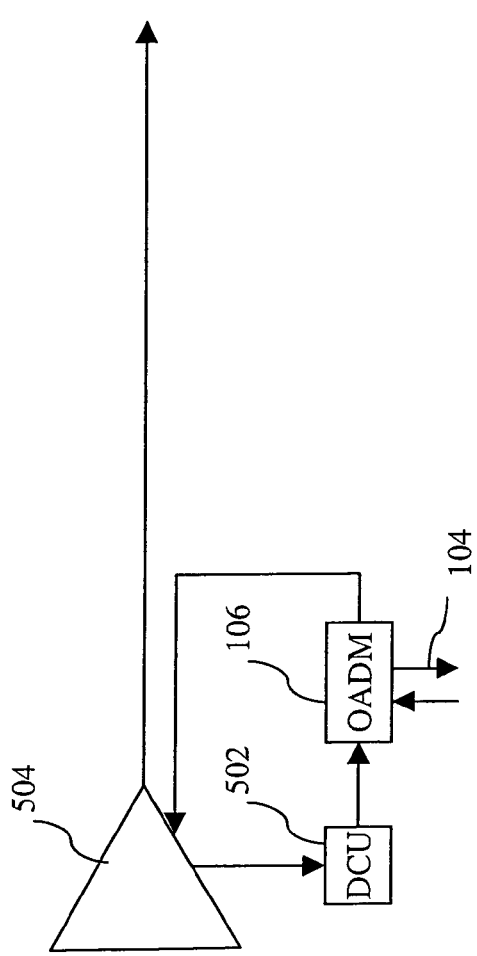
FIG. 5 depicts an OADM structure where an OADM and dispersion compensation unit are incorporated mid-stage within an amplifier.
Figure 6:
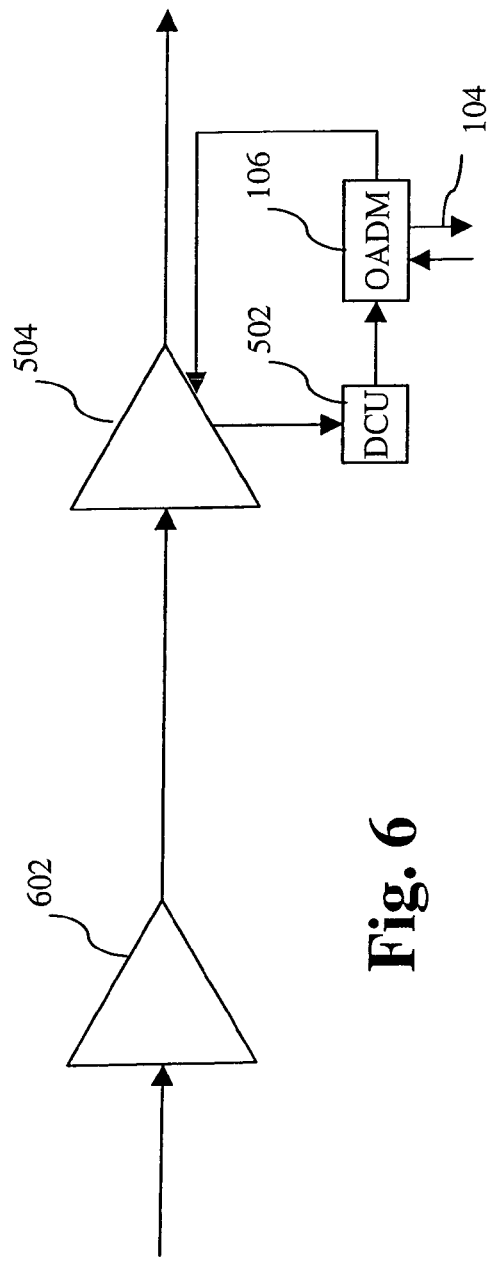
FIG. 6 depicts the OADM structure of FIG. 5 augmented with a pre-amplifier.

FIG. 5 depicts an embodiment where OADM 106 is itself located, in cascade with a chromatic dispersion compensation unit 502, mid-stage within a two-stage amplifier 504. The wavelengths transmitted over link 104 thus experience the first stage of amplification while the wavelengths received over link 104 experience the second stage of amplification. FIG. 6 depicts an embodiment that augments the amplification scheme of FIG. 5 with a preamplifier 602 that precedes amplifier 502 in a cascade configuration.

All of the optical amplifiers of FIGS. 2–6 may be, e.g., EDFAs. Any suitable optical amplification technique may be used consistent with the present invention. An overall amplifier gain between 20 dB and 30 dB, e.g., 22 dB, is envisioned in one implementation. A representative EDFA is the ONS15216 EDFA1™ available from Cisco Systems. Chromatic dispersion compensation may be provided by e.g., chromatic dispersion compensating gratings or dispersion compensating fiber. One implementation employs −1150 ps/nm, −750 ps/nm, or −350 ps/nm of dispersion compensation. A representative dispersion compensation unit is the ONS15216DCU™ available from Cisco Systems, Inc. It should be noted that the amplification and dispersion compensation structures shown in FIGS. 3–6 may also be used around ring 102, with or without the OADM as needed.

Figure 7:
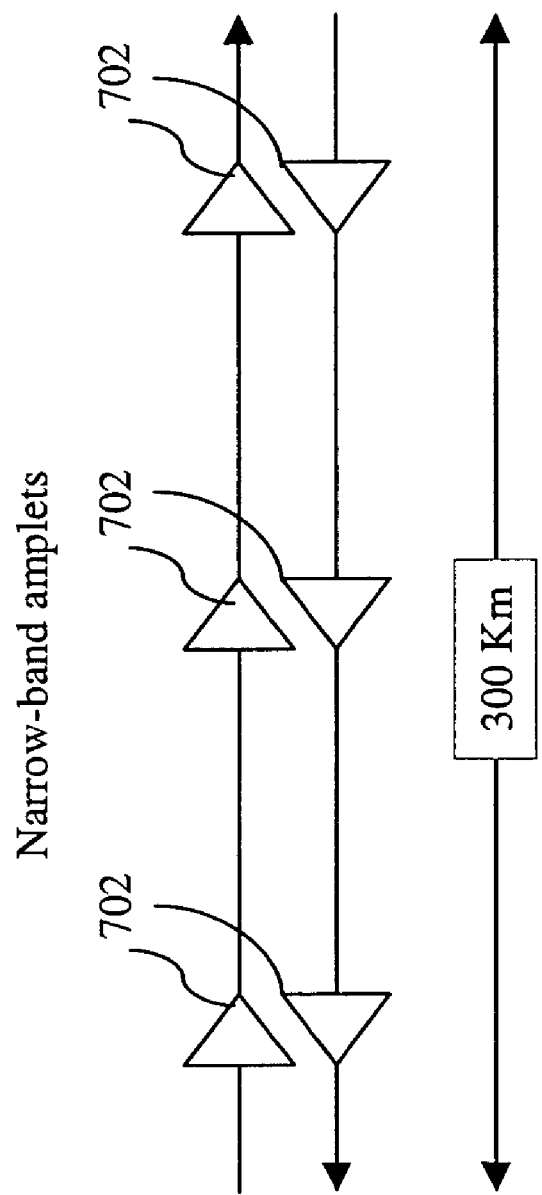
FIG. 7 depicts details of a link interconnecting optical rings according to one embodiment of the present invention.

FIG. 7 depicts details of link 104. Link 104 is depicted as a bi-directional link. Intermediate optical amplification is provided, in one embodiment, by narrow-band "amplets" 702. Link 104 may extend over a great distance, e.g., greater than 100 km and in FIG. 7 is depicted as extending over 300 km without the use of chromatic dispersion compensation. Even greater reaches without the use of chromatic dispersion compensation are envisioned by use of electronic chromatic dispersion compensation within optical receiver equipment. Narrow-band amplets 702 may be EDFAs having a bandwidth of e.g., less than 20 nm, 10 nm etc. Within a 10 nm window one can transmit 12 OC-48 wavelengths at 100 GHz spacing. In one implementation, an EOA-UR™ manufactured by MPB Communications, Inc. is employed and 25 dB of gain is set. In one embodiment, the amplets are spaced at 100 km intervals.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

The invention claimed is:

1. A method of operating an optical network, said method comprising:
   operating a first wavelength division multiplexing (WDM) ring simultaneously carrying a first wavelength having a first data rate signal and a second wavelength having a second data rate signal, said first data rate and said second data rate differing from each other;
   within said first WDM ring, applying chromatic dispersion compensation to both said first wavelength and said second wavelength; and
   transmitting said second wavelength over a link away from said ring, said link not incorporating chromatic dispersion compensation.

2. The method of claim 1 further comprising:
   operating a second WDM ring also carrying said second wavelength; and
   wherein said link connects said first WDM ring and said second WDM ring.

3. The method of claim 1 wherein said link extends greater than approximately 100 Km.

4. The method of claim 1 wherein transmitting comprises:
   selecting said second wavelength from light flow around said first WDM ring with an optical add/drop multiplexer (OADM).

5. The method of claim 1 wherein transmitting comprises:
   transmitting through at least one optical amplifier in said link, said optical amplifier having a bandwidth of approximately 20 nm or less.

6. The method of claim 1 wherein said second data rate is lower than said first data rate.

7. The method of claim 6 wherein said first data rate signal comprises an OC-192 signal and said second data rate signal comprises an OC-48 signal.

8. Apparatus for operating an optical network, said apparatus comprising:
   a first wavelength division multiplexing (WDM) ring simultaneously carrying a first wavelength having a first data rate signal and a second wavelength having a second data rate signal, said first data rate and said second data rate differing from each other, said first WDM ring being equipped with chromatic dispersion compensating equipment operative to provide chromatic dispersion compensation on both said first wavelength and said second wavelength;
   a link carrying said second data rate signal away from said link, said link not incorporating chromatic dispersion compensation equipment.

9. The apparatus of claim 8 further comprising a second WDM ring, said link interconnecting said first WDM ring and said second WDM ring.

10. The apparatus of claim 8 wherein said link extends greater than approximately 100 Km.

11. The apparatus of claim 8 wherein said first WDM ring comprises:
    an optical add/drop multiplexer (OADM) that selects said second wavelength from light flow around said first WDM ring for transmission down said link.

12. The apparatus of claim 8 wherein said link comprises:
    at least one optical amplifier having a bandwidth of approximately 20 nm or less.

13. The apparatus of claim 8 wherein said second data rate is lower than said first data rate.

14. The apparatus of claim 13 wherein said first data rate signal comprises an Optical Carrier (OC)-192 signal and said second data rate signal comprises an OC-48 signal.

15. Apparatus for operating an optical network, said apparatus comprising:
    means for operating a first wavelength division multiplexing (WDM) ring simultaneously carrying a first wavelength having a first data rate signal mid a second wavelength having a second data rate signal, said first data rate and said second data rate differing from each other;
    means for, within said first WDM ring, applying chromatic dispersion compensation to both said first wavelength and said second wavelength; and
    means for transmitting said second wavelength over a link away from said ring, said link not incorporating chromatic dispersion compensation.

16. The apparatus of claim 15 further comprising:
    means for operating a second WDM ring also carrying said second wavelength; and
    wherein said link connects said first WDM ring and said second WDM ring.

17. The apparatus of claim 15 wherein said link extends greater than approximately 100 Km.

18. The apparatus of claim 15 wherein said means for transmitting comprises:
    means for selecting said second wavelength from light flow around said first WDM ring.

19. The apparatus of claim 15 wherein said means for transmitting comprises:
    means for transmitting through at least one optical amplifier in said link, said optical amplifier having a bandwidth of approximately 20 nm or less.

20. The apparatus of claim 15 wherein said second data rate is lower than said first data rate.

21. The apparatus of claim 20 wherein said first data rate signal comprises an Optical Carrier (OC)-192 signal and said second data rate signal comprises an OC-48 signal.

* * * * *